Jan. 13, 1970  KATSUJI FUJIWARA  3,489,164

FREE FLOAT TYPE STEAM TRAP

Filed Aug. 18, 1967

INVENTOR.
KATSUJI FUJIWARA
BY
ATTORNEY

United States Patent Office 3,489,164
Patented Jan. 13, 1970

3,489,164
FREE FLOAT TYPE STEAM TRAP
Katsuji Fujiwara, 191 Nishitani, Hiraoka-cho,
Hyogo-ken, Kakogawa-shi, Japan
Filed Aug. 18, 1967, Ser. No. 661,674
Claims priority, application Japan, Nov. 29, 1966,
41/78,242; June 10, 1967, 42/37,255
Int. Cl. F16t 1/20
U.S. Cl. 137—192                         4 Claims

ABSTRACT OF THE DISCLOSURE

This invention relates to an improved steam trap and float for automatically removing condensate from steam lines.

This invention relates to steam traps of the free float type and more specifically to a novel and improved steam trap embodying a free float that is characterized by its dependability and relatively low cost.

Free float steam traps are relatively simple in structure in that they have a single operating portion and have been found to operate efficiently and effect continuous discharge of condensation with little difficulty. However, known steam traps having free floats are relatively costly to manufacture since the float must be a true sphere so that any portion thereof which contacts the valve opening must assure complete closure of the valve. Furthermore, in order to provide adequate buoyancy it is important that the float be as large as possible and yet be relatively light in weight. Accordingly, the wall thickness must be maintained at a minimum. Furthermore, since the float is hollow and must be made of two hemispherical sections, the sections must be welded together and the welded portion must be finished with a high degree of precision. Since the wall is relatively thin, the welding and finishing operations are exceedingly difficult.

This invention overcomes the aforementioned difficulties with prior known free float steam traps and provides a novel and improved structure which does not require finishing of the welded portion which joins the two sections forming the float.

Another object of the invention resides in the novel and improved free float steam trap in which the float may include a single hemispherical portion and need not be in the form of a complete sphere.

Still another object of the invention resides in a novel and improved free float steam trap having excellent efficiency and affording dependable and reliable operation.

The above and other objects of the invention will become more apparent from the following description and accompanying drawings forming part of this application.

In one embodiment of the invention, the free float steam trap is provided with a valve chamber having an inlet for receiving condensation and an outlet for discharging condensation after it has reached a certain level within the trap. A hollow spherical float formed of two hemispherical sections is contained within the valve chamber and cooperates with a valve seat communicating with the outlet so that when the condensation level is low, the float will close the valve and when the condensation level rises, it will cause the float to displace itself from the valve opening and permit discharge of the condensation. In the formation of the float, the wall thickness of one of the hemispherical sections is somewhat thicker than the other hemispherical section so that the center of gravity of the float is disposed well within one of the hemispherical sections and on the vertical axis common to the two sections. In this way the float will always remain in a predetermined position within the valve so that the welded portion joining the sections will not contact the valve seat.

A modified embodiment of the invention utilizes a weight secured to one of the hemispherical sections so that the center of gravity is again well within one of the hemispherical sections and on the common central vertical axis.

Still another embodiment of the invention involves the utilization of a float having an annular flange and means within the float cooperating with the flange to limit rotational movement of the float relative to the valve.

Figure 1:
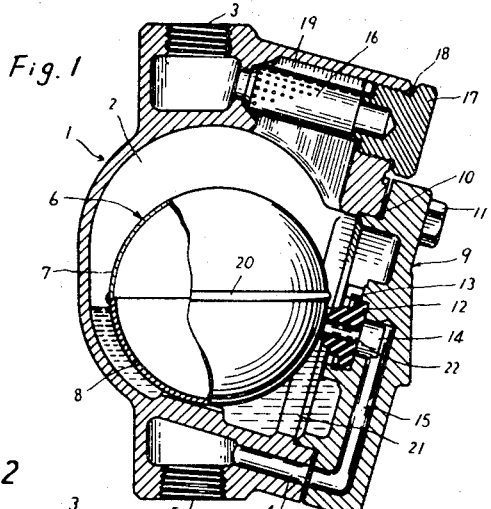
FIGURE 1 is a vertical sectional view of a novel and improved free float steam trap in accordance with the invention.
Figure 2:
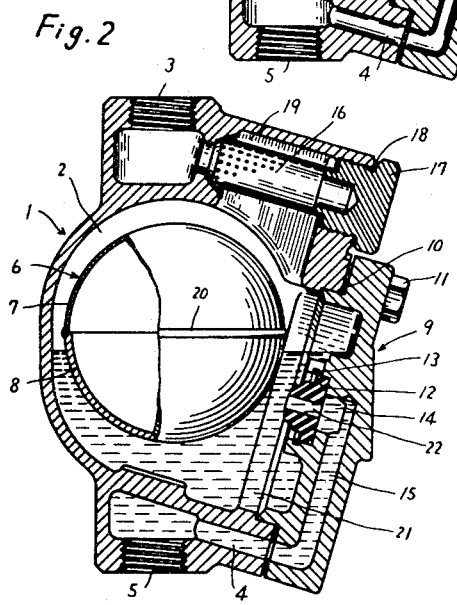
FIGURE 2 is a vertical sectional view similar to FIGURE 1 illustrating the float valve in an open position.

More specifically and with reference to the form of the invention shown in FIGURES 1 and 2, the numeral 1 denotes the main body of a steam trap in accordance with the invention. The valve body 1 has an internal chamber 2, an inlet 3 communicating with the chamber 2, a discharge passage 4 and an outlet 5. The float 6 dispossed within the chamber 2 is formed of two hemispherical sections 7 and 8 integrally welded one to the other. The wall thickness of the section 8 is materially greater than the wall thickness of the section 7.

The steam trap cover 9 which is secured to the valve body 1 after insertion of the float 6 is held in position by means of bolts 11 and packing 10. The valve seat 12 is fixed in position by a snap ring 13 and communicates with the discharge opening 14 which communicates via the ducts 15 and 4 to the outlet 5. A screen 16 having a plurality of small openings is carried within a passage 19 and held in position by a plug 17 sealed to the main body 2 by a gasket 18. Thus the condensate entering the inlet 3 flows through the screen 16 and thence into the chamber 2.

The sections 7 and 8 of the float 6 are secured together by a peripheral weld 20, and when the section 8 of the float 6 is resting on the bottom of the chamber 2, that section also closes the valve opening 22 and the weld 20 remains at all times above the level of that valve opening as shown in FIGURE 1.

In the invention as described above, as condensate flows into the chamber 2, it is stored in a reservoir generally denoted by the numeral 21. Since the wall thickness of the float section 8 is heavier than that of the float section 7 as the condensate level increases, the float will rise but will also maintain the position shown in FIGURE 1 with the welded portion 20 substantially parallel to the surface of the condensate.

As the condensate level increases, a force will be developed on the float causing it to overcome any back pressure whereupon it will move upwardly as illustrated in FIGURE 2. Under this condition condensate will leave the chamber 2 through the passages 22, 15, and 4 and discharge through the outlet 5. As the condensate level lowers, the float 6 will again engage the valve seat 12 and as a result of the back pressure will cause the float to move tight against the valve seat 12 and thereby close the passage 22. Thus the lower half 8 of the float 6 is the only portion of the float that will contact the valve seat 12 and the welded portion 20 cannot under any circumstance contact that valve seat.

From the foregoing it is evident that the weld portion 20 of the float 6 need not be finished but may be left in the original welded state, thereby reducing materially the cost of the valve. Furthermore, the float is not weakened in any way and free float steam traps of relatively small size and simple structure can be constructed having relatively high efficiency and little difficulty with maintenance.

While it is preferable that the outer surface of each of the hemispherical sections 7 and 8 of the float 6 be truly spherical to withstand the pressures involved, with the present invention should the pressures be more moderate in magnitude, the hemispherical sections need not be truly hemispherical. For instance, in the embodiment of the invention illustrated in FIGURES 1 and 2, the hemispherical section 7 could in extreme cases be replaced by a plane surface. Furthermore, the lower hemispherical section 8 can also have any desired curvature provided however it is symmetrical about a central vertical axis and will provide contact with the valve seat 12 to insure complete closure of the passage 22.

Other means may be employed for maintaining the position of the float 6 within the chamber 2. For example, magnetic means may be utilized or the float may be provided with a weight fixed to the center inner surface of the lower hemispherical section of the float so that the center of gravity is positioned in the lower hemispherical section. This form of the invention is shown in FIGURE 3.

Figure 3:
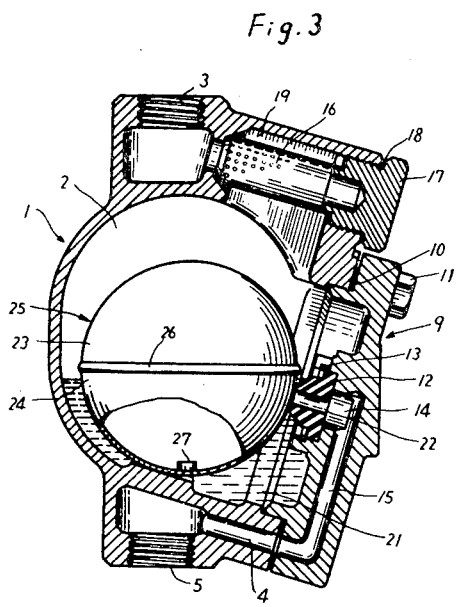
FIGURE 3 is a vertical sectional view of a modified form of a free float steam trap in accordance with the invention.

In FIGURE 3 the steam trap with the exception of the float is substantially identical to the form of the invention shown in FIGURES 1 and 2, and like numerals have been utilized to denote like portions of both forms of the invention. In this form of the invention, however, the float generally denoted by the numeral 25 is a hollow, globe formed of sections 23 and 24 welded at 26. A weight 27 is fixed within the lower hemispherical section 24 so that the operation of the trap shown in FIGURE 3 is identical to that illustrated and described in connection with FIGURES 1 and 2.

Figure 4:
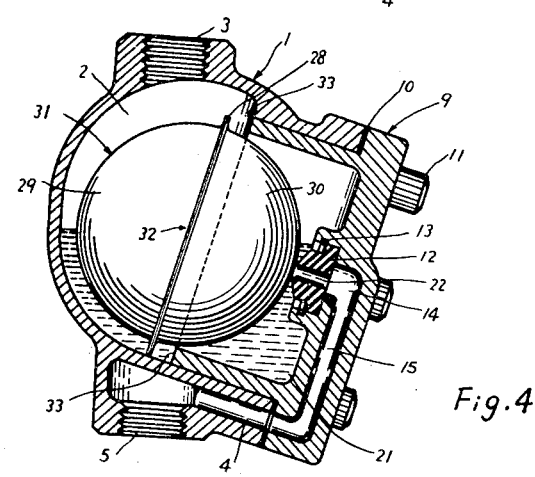
FIGURE 4 is a vertical sectional view of still another modified form of a free float steam trap in accordance with the invention.
Figure 5:
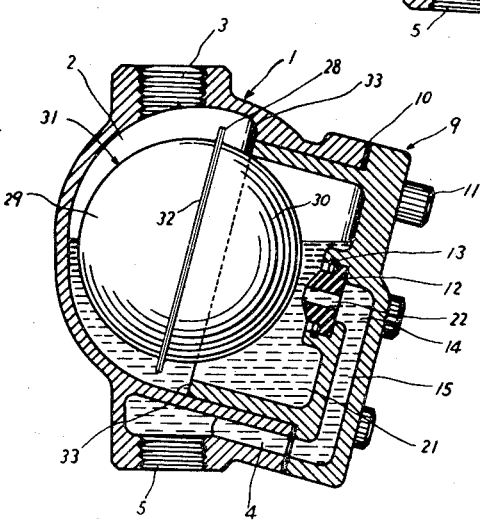
FIGURE 5 is a vertical sectional view of the steam trap of FIGURE 4 with the valve in the open position.

FIGURES 4 and 5 illustrate still another embodiment of the invention and corresponding elements of the form of the invention shown in these figures and those shown in previous figures are denoted by like numerals. In this form of the invention the float 31 is formed of hemispherical sections 29 and 30, each having annular flanges 32 and 28 joined one to the other about their peripheries. The steam trap cover 9 secured to the body 1 has an annular flange 33 which is symmetrically disposed about the valve seat 12. The annular flange 33 has a diameter permitting it to engage the sealed flanges 32 and 28, thus limiting rotation of the float 31 within the chamber 2. With this arrangement, the hemispherical section 30 will function to close the passage 22 in the valve seat 12 as illustrated in FIGURE 4 while the hemispherical section 29 is prevented from contacting the valve seat 12. When the water level of the condensate within the chamber 2 is sufficient to overcome the back pressure, the float 29 will tend to rise and move outwardly from the valve seat 12 to open the valve and permit discharge of the condensate as illustrated in FIGURE 5. Thus the performance of the steam trap illustrated in FIGURES 4 and 5 is similar to the operation of the previous forms of the invention. Although the flange 33 and the flanges 28 and 32 are of annular configuration, it is evident that the respective contours can be selected so that the movement of the float in accordance with the changes in the water level is so restricted that only one of the hemispherical sections can engage the valve seat 12.

While only certain embodiments of the invention have been illustrated and described, it is apparent that alterations, modifications and changes may be made without departing from the true scope and spirit thereof as defined by the appended claims.

What is claimed is:

1. A free float steam trap comprising a housing having a chamber therein, an inlet for receiving condensate, an outlet including a valve seat for discharging condensate, a wholly free float within said chamber, means at the bottom of said chamber for supporting said float when said condensate has a level insufficient to raise said float, said float having at least one smoothly curved section for engagement with said valve seat when the level of condensate is low ot close said outlet and an annular discontinuity adjoining said curved section, said float being displaced trom engagement with said valve seat solely by the condensate when the condensate level attains a predetermined depth within said chamber, and means on said float operable to maintain it in a position within said chamber to cause said discontinuity to remain in a substantially horizontal plane, said outlet being disposed below said horizontal plane when said float is in the lowermost position whereby said smoothly curved section will engage said valve seat when the condensate is at said low level and prevent engagement of the discontinuity with said seat.

2. A free float steam trap according to claim 1 wherein said float comprises two hemispherical sections secured one to the other, said discontinuity is positioned at the joinder of said sections and the last said means comprises positioning the center of gravity within one of said hemispherical sections and wherein said valve is engaged by said one section of said float.

3. A free float steam trap according to claim 2 wherein said one hemispherical section has a wall thickness greater than that of the other section.

4. A free float steam trap according to claim 2 wherein said one hemispherical section includes a weight secured to the internal surface thereof.

References Cited

UNITED STATES PATENTS

| | | | |
|---|---|---|---|
| 573,556 | 12/1896 | Thompson | 137—443 X |
| 306,012 | 9/1884 | Garland | 137—433 |
| 369,003 | 8/1887 | Harvey | 137—433 X |
| 1,962,360 | 6/1934 | Pflugheber | 137—192 X |
| 2,013,015 | 9/1935 | Vincent | 137—192 |

ALAN COHAN, Primary Examiner

U.S. Cl. X.R.

137—433